(12) United States Patent
Yang et al.

(10) Patent No.: US 8,915,516 B2
(45) Date of Patent: Dec. 23, 2014

(54) CONVERTIBLE TANDEM STROLLER FRAME

(71) Applicant: Lerado(Zhong Shan)Industrial Co., Ltd, Zhong Shan, Guang Dong Province (CN)

(72) Inventors: Cheng-Fan Yang, Tainan (TW); Chen-Tai Chang, Taibao (TW); Sheng-Po Hung, Chiayi (TW); Fu-Peng Chou, Taichung (TW)

(73) Assignee: Lerado (Zhong Shan) Industrial Co., Ltd., Zhong Shan, Guang Dong Province (CN)

( * ) Notice: Subject to any disclaimer, the term of this patent is extended or adjusted under 35 U.S.C. 154(b) by 0 days.

(21) Appl. No.: 13/783,849

(22) Filed: Mar. 4, 2013

(65) Prior Publication Data
US 2013/0234419 A1    Sep. 12, 2013

(30) Foreign Application Priority Data
Mar. 9, 2012    (CN) ...................... 2012 2 0089663 U (51) Int. Cl.
*B62B 7/06* (2006.01)
*B62B 9/12* (2006.01)
*B62B 7/00* (2006.01)

(52) U.S. Cl.
CPC .. *B62B 9/12* (2013.01); *B62B 7/008* (2013.01)
USPC ......................................... 280/642; 280/643

(58) Field of Classification Search
CPC ....................................................... B62B 7/008
USPC .................................................. 280/642–643
See application file for complete search history.

(56) References Cited

U.S. PATENT DOCUMENTS

| 6,676,140 | B1* | 1/2004 | Gondobintoro | 280/33.993 |
| 8,480,115 | B2* | 7/2013 | Chen et al. | 280/643 |
| 2004/0169353 | A1* | 9/2004 | Kinzel | 280/650 |
| 2006/0290107 | A1* | 12/2006 | Powers | 280/658 |

FOREIGN PATENT DOCUMENTS

CN    201371841 Y    12/2009

* cited by examiner

*Primary Examiner* — Jeffrey J Restifo
*Assistant Examiner* — Erez Gurari
(74) *Attorney, Agent, or Firm* — Muncy, Geissler, Olds & Lowe, P.C.

(57) ABSTRACT

A convertible tandem stroller frame is capable of locking in a tandem stroller mode for installing a second seat thereby concurrently transporting two occupants, and capable of converting said mode into a single seat mode for transporting single occupant by simply manipulating a release actuator at a front portion of the convertible tandem stroller frame. The convertible tandem stroller frame may include a front rack, a rear rack, at least a longitudinal telescopic mechanism and at least a locking mechanism. The front rack and the rear rack are lockably and adjustably connected by the longitudinal telescopic mechanism, so as to be extended into the tandem stroller mode and be retracted into the single seat mode. The locking mechanism is associated with the release actuator for locking and un-locking the longitudinal telescopic mechanism by manipulating in front of the convertible tandem stroller frame.

9 Claims, 8 Drawing Sheets

CONVERTIBLE TANDEM STROLLER FRAME

BACKGROUND OF THE INVENTION

1. Field of the Invention

The present invention relates to a convertible tandem stroller frame, especially to a convertible tandem stroller frame equipped with a release actuator mounted at the front end of it to lock and un-lock a longitudinal telescopic mechanism.

2. Description of the Related Art

Strollers are now essential for use in the transportation of baby and little children. Normally, upon a family comes to have a new born baby with more than one little child, often resorts to purchasing more than one stroller for transporting more than one little child and or baby at a time, but it is impossible for one person to safely push and control so many single strollers simultaneously. The stroller industry has offered a kind of double-stroller or tandem stroller for solution.

However, the tandem stroller is expensive and wasteful for a person with a single child who only irregularly takes care of another child, considering that the tandem stroller is unnecessary most of the time in such circumstances.

Further, tandem strollers are awkward to push and control when transporting a single child, given the resulting off-balance alignment in such a situation. Further, the structure and mechanism of such strollers to permit for ease of operation and folding is relatively cumbersome and complicated.

A newly improved tandem stroller as being disclosed in China Patent Filing Number 200820176373.4 (now Patent Number CN 201371841 Y) is adjustable in length for converting itself into a single stroller; however, the converting actuator is mounted on the rear end of the tandem stroller, user should manipulate behind the stroller, however they cannot use one hand to manipulate the actuator behind the stroller and reach out another hand far to pull the stroller frame extending forward at same time.

SUMMARY OF THE INVENTION

In order to eliminate the foresaid drawbacks of the known improved tandem stroller structure, the present invention provides a convertible tandem stroller frame, which is featured by capable of manipulating at the front end, so as to pull and push against front portion for converting it into a tandem stroller mode for installing a second seat thereby concurrently transporting two occupants, and convert it from said mode into a single seat mode for transporting single occupant by simply manipulating a release actuator at a front portion of the convertible tandem stroller frame.

The convertible tandem stroller frame according to the present invention, may include a front rack, a rear rack, at least a longitudinal telescopic mechanism and at least a locking mechanism. The front rack and the rear rack are lockably and adjustably connected by the longitudinal telescopic mechanism, so as to be extended into the tandem stroller mode and be retracted into the single seat mode.

The locking mechanism is associated with the release actuator for locking and un-locking the longitudinal telescopic mechanism by manipulating in front of the convertible tandem stroller frame.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention; examples of which are illustrated in the accompanying drawings.

Figure 1:
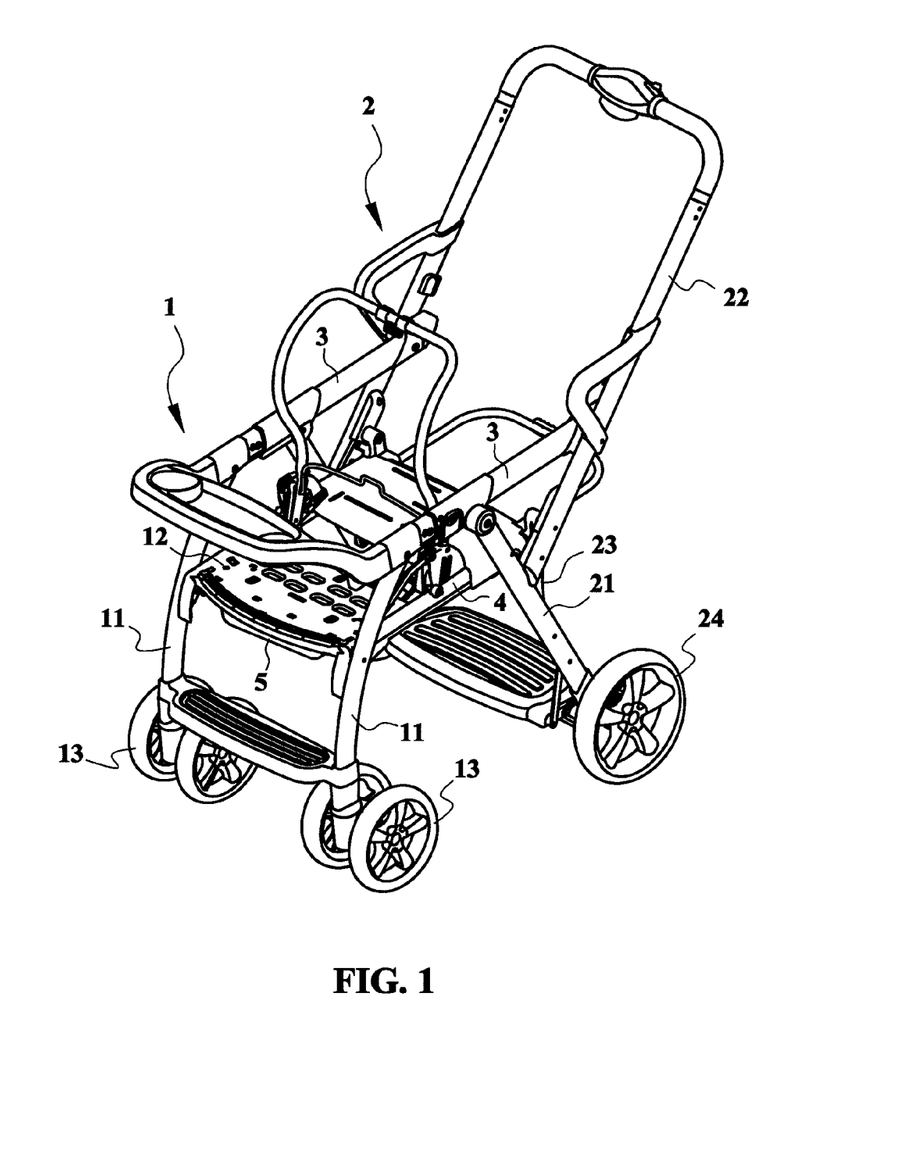
FIG. 1 is a front-left perspective view for showing an embodiment of the convertible tandem stroller frame according to the present invention.
Figure 2:
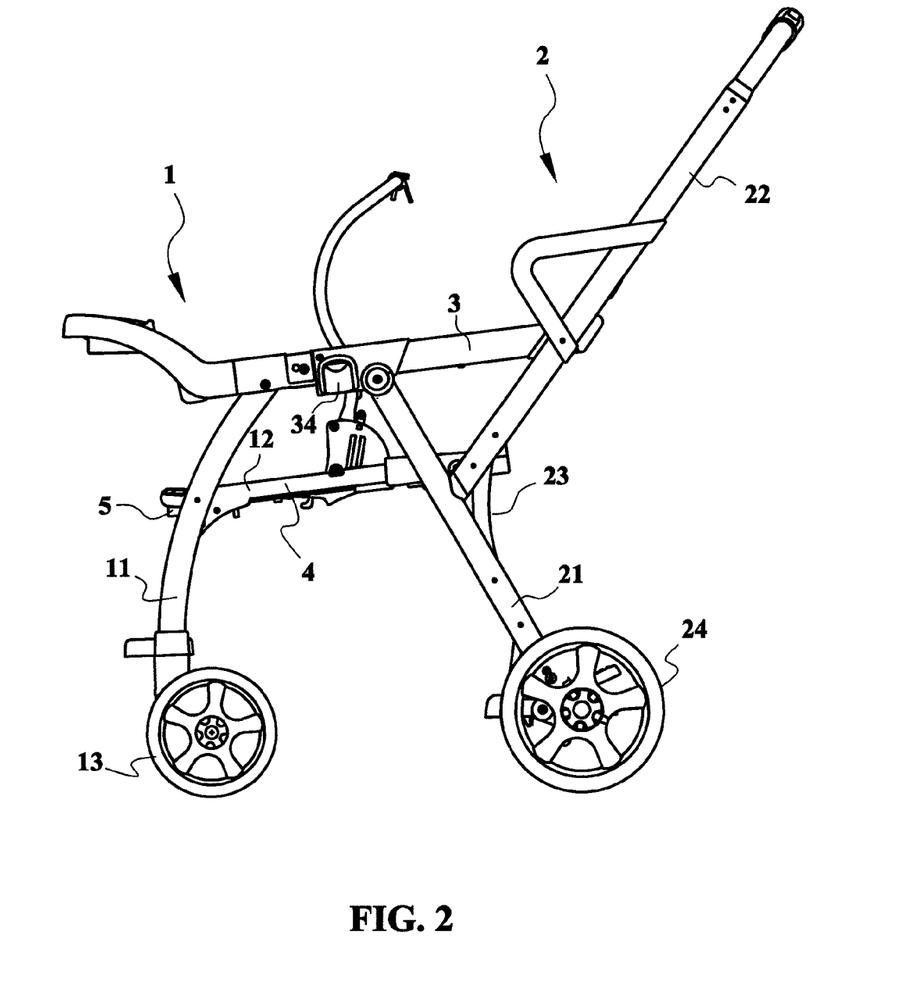
FIG. 2 is a side view for showing the embodiment of the convertible tandem stroller frame according to the present invention.

Referring to FIGS. 4 to 7, an embodiment of the convertible tandem stroller frame according to the present invention is capable of locking in a tandem stroller mode for installing a second seat (not shown) and concurrently transporting two occupants and capable of converting said tandem stroller mode into a single seat mode as shown in FIGS. 1 and 2 for transporting single occupant by manipulating a release mechanism 5.

The convertible tandem stroller frame includes a front rack 1, a rear rack 2, at least a longitudinal telescopic mechanism and at least a locking mechanism 33, 43.

The front rack 1 may include at least a front strut 11 equipped with a front wheel 13 of the convertible tandem stroller frame. Preferably, the front rack 1 may be connected a first seat 12 for accommodating an occupant when being used in the single seat mode.

The rear rack 2 includes a pair of rear side struts 21 each being equipped with a rear wheel 24 of the convertible tandem stroller frame, and a pair of push bars 22 connected to the rear side struts 21 for pushing the convertible tandem stroller frame from rear side.

Figure 3:
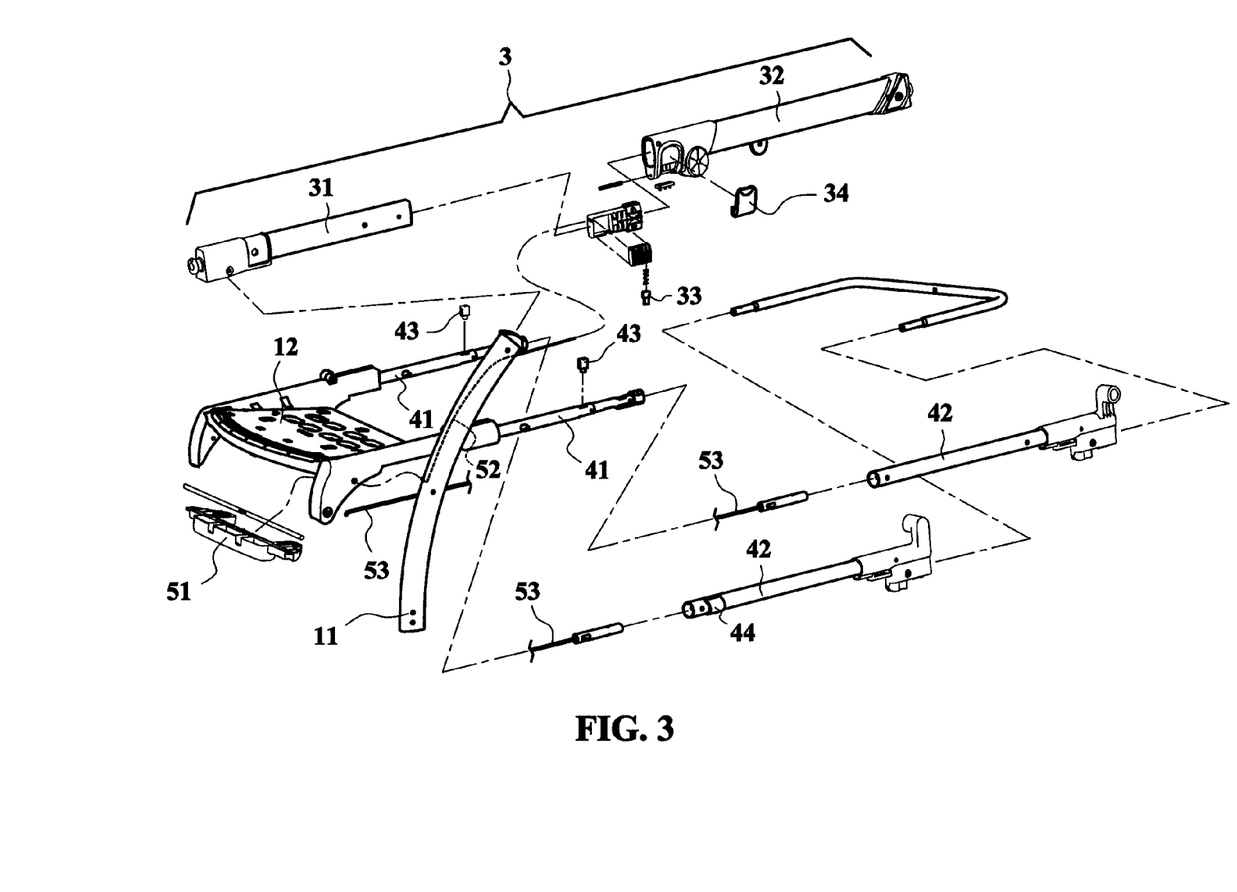
FIG. 3 is an exploded perspective view showing a longitudinal telescopic mechanism and a locking mechanism of the convertible tandem stroller frame according to the present invention.
Figure 4:
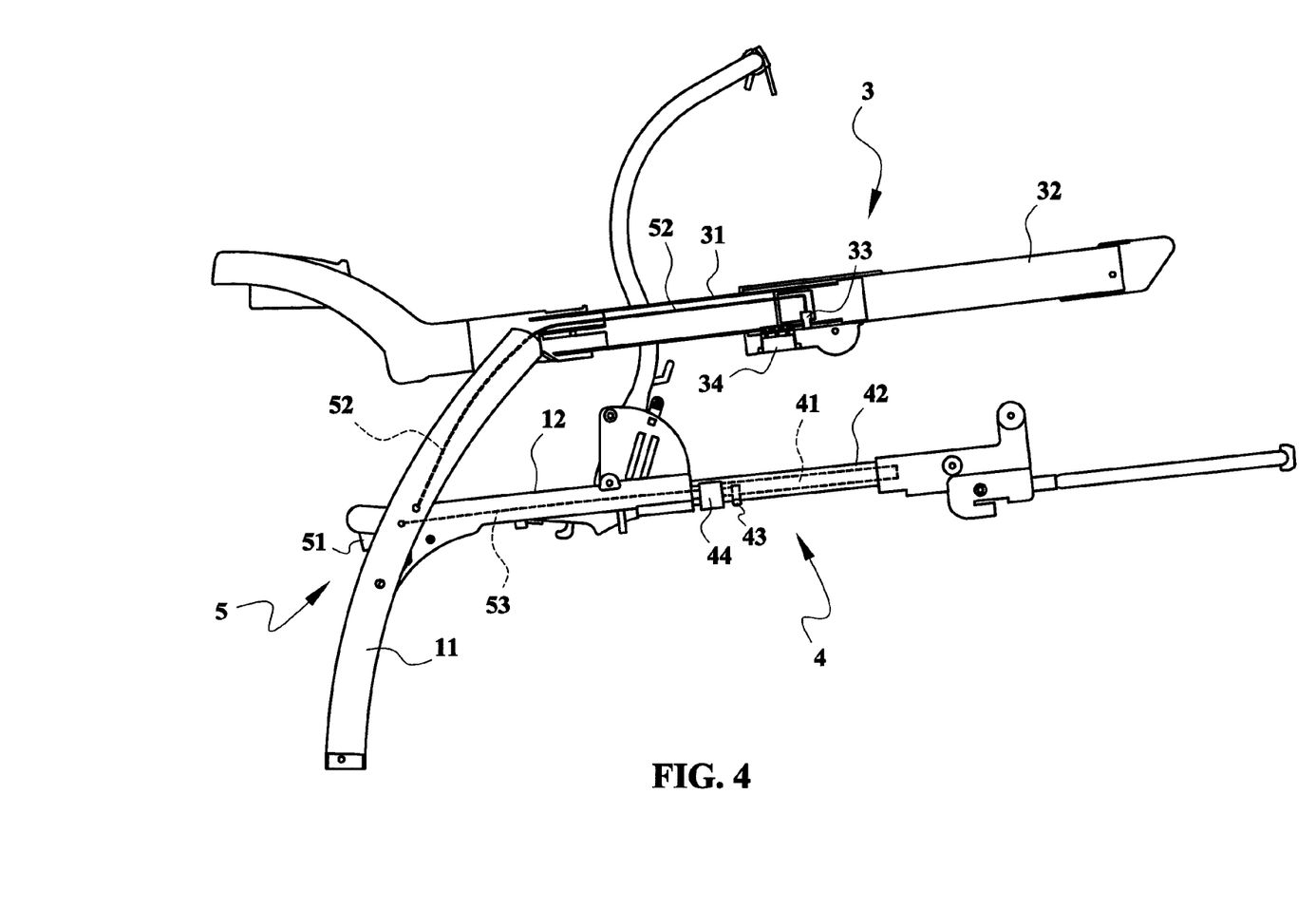
FIG. 4 is a side view showing a longitudinal telescopic mechanism and a locking mechanism of the convertible tandem stroller frame according to the present invention.

Referring to FIGS. 3 and 4, the present embodiment includes an upper longitudinal telescopic mechanism 3 equipped with an upper locking mechanism 33, and a lower longitudinal telescopic mechanism 4 equipped with a lower locking mechanisms 34.

The release mechanism 5 may include a release actuator 51 operatively mounted at the front portion of the convertible tandem stroller frame. The longitudinal telescopic mechanisms 3, 4 both are extendable and retractable for lockably and adjustably connecting the front rack 1 and the rear rack 2.

The locking mechanisms 33, 43 may associate with the release actuator 51 and be adopted to lock and un-lock the longitudinal telescopic mechanism by manipulating the release actuator 51 from the front portion of the convertible tandem stroller frame.

The upper longitudinal telescopic mechanism 3 may include a pair of first inner tubes 31 for connecting with the front rack 1, and a pair of first outer tubes 32 for connecting with the rear rack 2 and telescopically engaged with the first inner tubes 31.

The lower longitudinal telescopic mechanism 4 may include a pair of second inner tubes 41 spaced apart from the first inner tubes 31 and connected to the front rack 1, and a pair of second outer tubes 42 spaced apart from the first outer tubes 32 and telescopically engaged with the second inner tubes 41.

Figure 8:
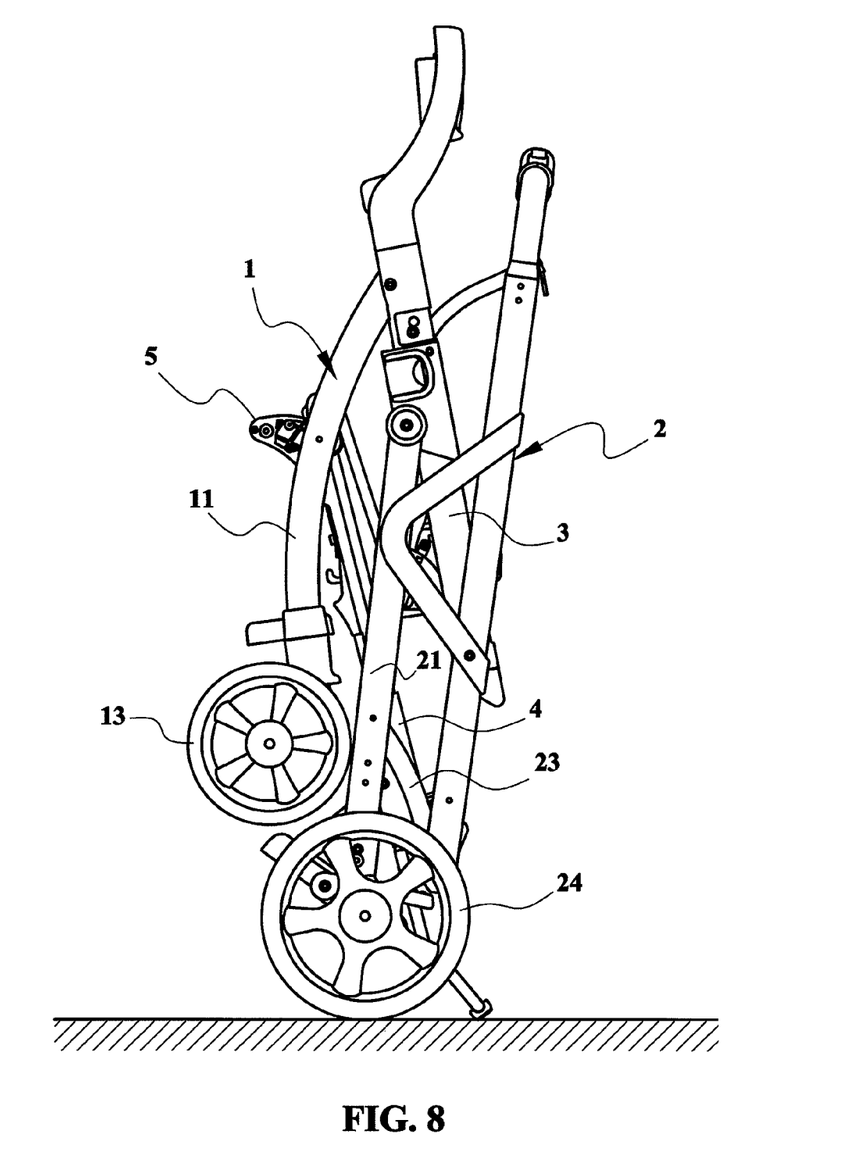
FIG. 8. is a schematic perspective view illustrating the embodiment of the convertible tandem stroller frame being folded into a compact configuration.

Preferably, for folding in a more compact configuration for storage and shipping, the pair of first inner tubes 31 as well as the second inner tubes 41 may be pivotally connected with the front strut 11, and the first outer tubes 32 and second outer tubes 42 may also be pivoted with the rear side struts 21 that permits the convertible tandem stroller frame to be foldable into a compact configuration as shown in FIG. 8.

The first outer tubes 32 may be pivoted with the rear side struts 21 and the push bars 22 for permitting the rear rack 2 to be foldable into a compact configuration. In this embodiment, a pair of linking rods 23 is adopted to pivotally link the rear rack 2 and the push bars 22. The push bars 22 each may have a distal end for lockably abutting on an intermediate portion of the rear side struts 21 for locking the rear rack 2 in an erected use configuration, and unlocking the rear rack 2 from the erected use configuration.

The upper locking mechanism 33 may be a pair of first spring-biased latches retractably mounted inside the pair of first inner tubes 31 and capable of protruding outwardly from the first inner tubes 31 to engage the first outer tubes 32 thereby positioning the first outer tubes 32 relative to the first inner tubes 31 in step-less increments and at least a predetermined position.

The lower locking mechanism 43 may also include a pair of second spring-biased latches retractably mounted inside the second inner tubes 41 and capable of protruding outwardly from the second inner tubes 41 to engage the second outer tubes 42 thereby positioning the second outer tubes 42 relative to the second inner tubes 41 in step-less increments and at least a predetermined position.

The release actuator 51 may be embodied as a handle operatively mounted under the first seat 12, and associates the locking mechanisms 33, 43 by a first flexible connecting element 52 and a second flexible connecting element 53, so as to release the locking mechanisms 33, 43 simultaneously.

In this embodiment, the first seat 12 is slidably and adjustably mounted on the second inner tubes 41 for best use of occupant in different growing stage. Alternatively, the first seat 12 may also be pivoted on the second inner tubes 41 and capable of folding together with the front rack 1 and rear rack 2.

The release actuator 51 may be embodied as a handle which operatively mounted under the first seat 12, and associates the pair of first spring-biased latches 33 by a first flexible connecting element 52 for associating the locking mechanisms 33, 43 and associates the pair of second spring-biased latches 43 by a second flexible connecting element 53.

Figure 5:
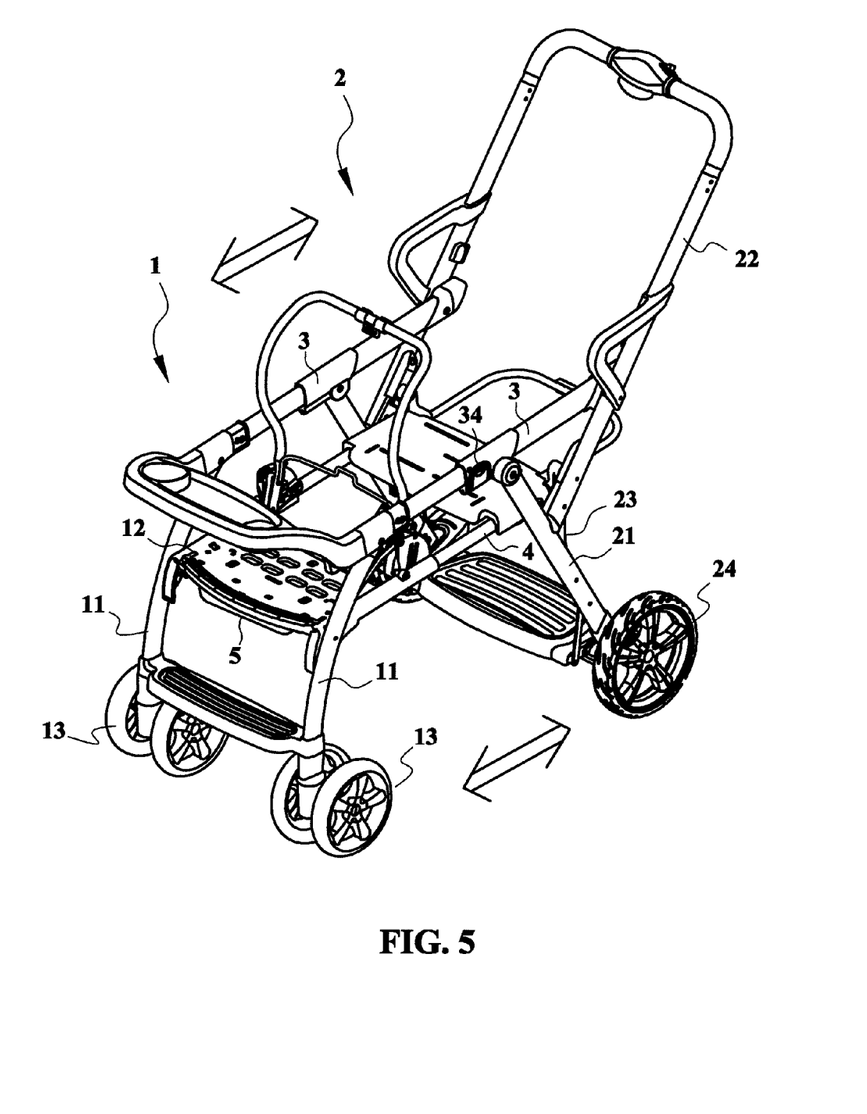
FIG. 5 is a schematic perspective view illustrating the conversion of the convertible tandem stroller frame according to the present invention.
Figure 6:
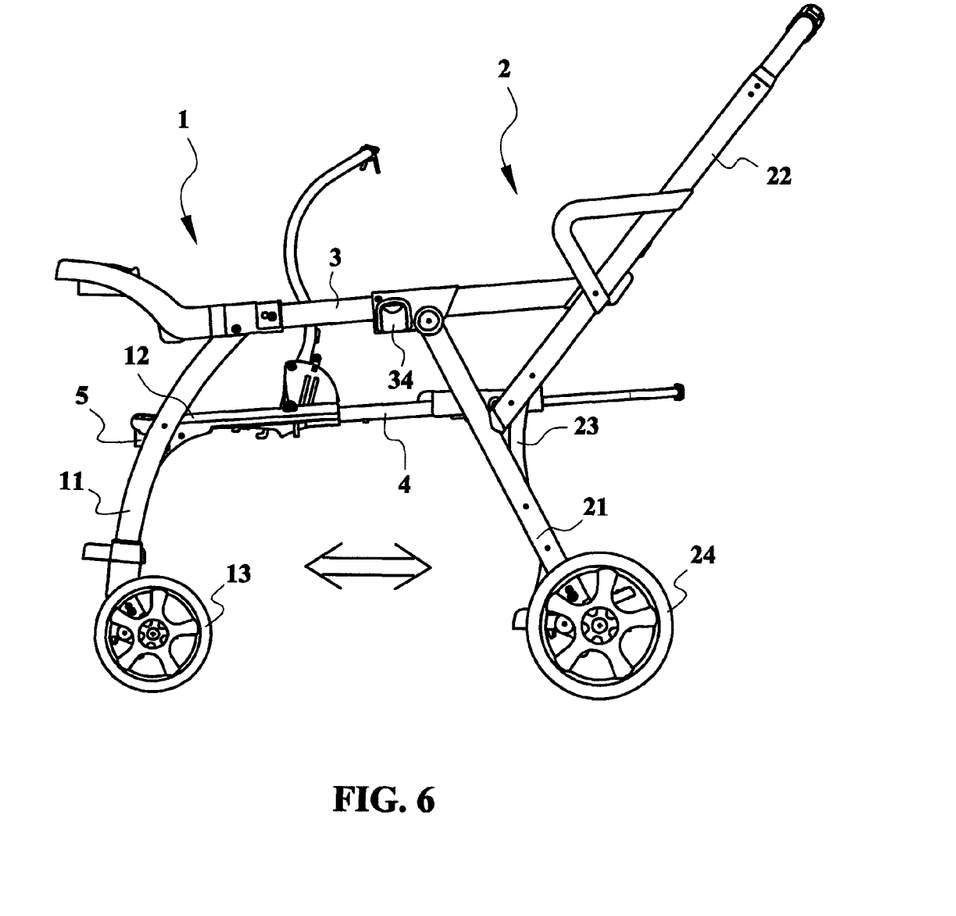
FIG. 6 is a schematic perspective view illustrating the embodiment of the convertible tandem stroller frame being converted into a tandem stroller mode for attaching a second seat (not shown) behind the first seat.
Figure 7:
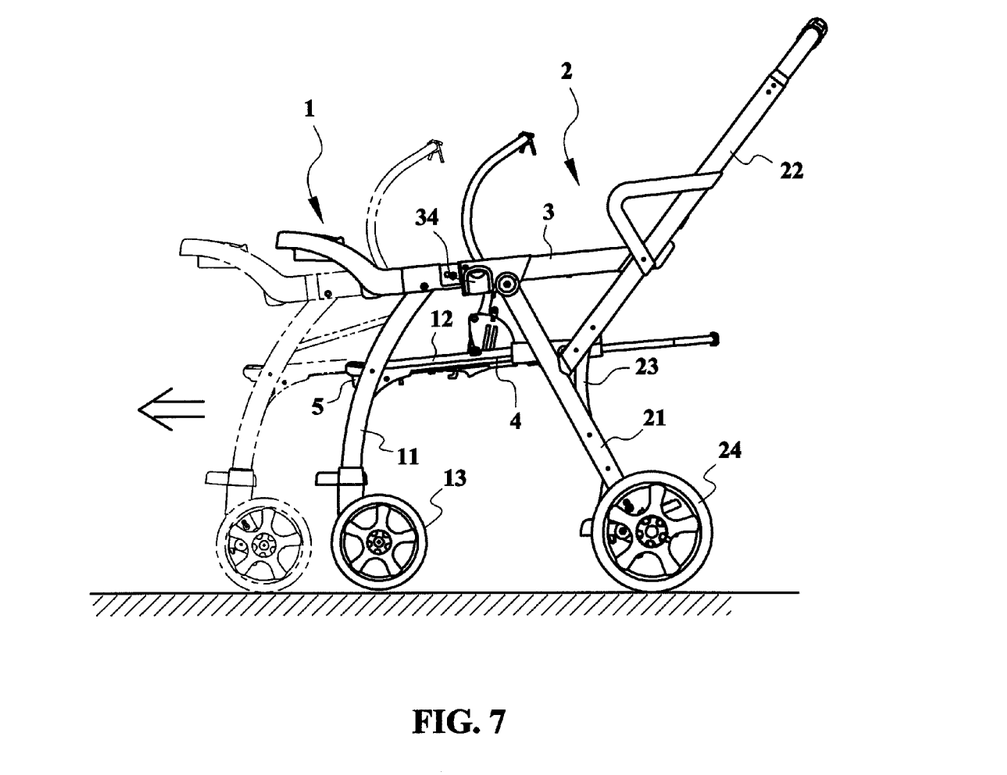
FIG. 7. a schematic side view illustrating the conversion of the convertible tandem stroller frame according to the present invention.

Referring to FIGS. 4 and 5, the convertible tandem stroller frame may further include at least a first lock element 34 operatively mounted on the first outer tubes 32 for releasably engaging with the first inner tubes 31 to position the first inner tubes 31 relative to the first outer tubes 32; preferably, further to include a second lock element 44 operatively mounted on the second outer tubes 42 for releasably engaging with the second inner tubes 41 to position the second inner tubes 41 relative to the second outer tubes 42.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A convertible tandem stroller frame is featured in being capable of locking in a tandem stroller mode for installing a second seat and concurrently transporting two occupants and capable of converting said mode into a single seat mode for transporting one occupant by manipulating a release actuator installed at a front portion thereof; said convertible tandem stroller frame including:
   a front rack, having at least a front strut equipped with a front wheel of the convertible tandem stroller frame;
   a rear rack, having a pair of rear side struts each being equipped with a rear wheels of the convertible tandem stroller frame, and a pair of push bars connected to the rear side struts for pushing the convertible tandem stroller frame from rear side;
   at least a longitudinal telescopic mechanism being extendable and retractable for lockably and adjustably connecting the front rack and the rear rack, and;
   at least a locking mechanism associated with the release actuator, and adopted to lock and un-lock the longitudinal telescopic mechanism by manipulating the release actuator at the front portion of the convertible tandem stroller frame;
   wherein the front rack further includes a first seat for accommodating an occupant to sit thereon; and
   wherein the release actuator includes a handle operatively mounted under the first seat, and associates the locking mechanism by at least a flexible connecting element.

2. The convertible tandem stroller frame of claim 1, wherein the first seat is mounted on the second inner tubes.

3. A convertible tandem stroller frame is featured in being capable of locking in a tandem stroller mode for installing a second seat and concurrently transporting two occupants and capable of converting said mode into a single seat mode for transporting one occupant by manipulating a release actuator installed at a front portion thereof; said convertible tandem stroller frame including:
   a front rack, having at least a front strut equipped with a front wheel of the convertible tandem stroller frame;
   a rear rack, having a pair of rear side struts each being equipped with a rear wheels of the convertible tandem stroller frame, and a pair of push bars connected to the rear side struts for pushing the convertible tandem stroller frame from rear side;
   at least a longitudinal telescopic mechanism being extendable and retractable for lockably and adjustably connecting the front rack and the rear rack, and;
   at least a locking mechanism associated with the release actuator, and adopted to lock and un-lock the longitudinal telescopic mechanism by manipulating the release actuator at the front portion of the convertible tandem stroller frame;
   wherein the longitudinal telescopic mechanism includes:
   a pair of first inner tubes, connected to the front rack;
   a pair of second inner tubes, spaced apart from the first inner tubes and connected to the front rack;

a pair of first outer tubes, connected to the rear rack and telescopically engaged with the first inner tubes; and a pair of second outer tubes, spaced apart from the first outer tubes and telescopically engaged with the second inner tubes;

wherein the locking mechanism includes a pair of first spring-biased latches retractably mounted inside the first inner tubes and capable of protruding outwardly from the first inner tubes to engage the first outer tubes thereby positioning the first outer tubes relative to the first inner tubes in step-less increments and at least a predetermined position; and wherein the front rack further includes a first seat mounted on the second inner tubes for accommodating an occupant to sit thereon, and wherein the release actuator is a handle operatively mounted under the first seat, and associates the pair of first spring-biased latches by a first flexible connecting element.

4. The convertible tandem stroller frame of claim 3, wherein the pair of first inner tubes are pivoted with the front strut, and the first outer tubes are pivoted with the rear side struts that permits the convertible tandem stroller frame to be foldable into a compact configuration for storage and shipping.

5. The convertible tandem stroller frame of claim 3, wherein the first outer tubes are pivoted with the rear side struts and the push bars for permitting the rear rack to be foldable into a compact configuration.

6. The convertible tandem stroller frame of claim 3, wherein the rear rack further includes a pair of linking rods adapted for pivotally linking the push bars to the rear side struts, wherein the push bars each has a distal end for lockably abutting on an intermediate portion of the rear side struts for locking the rear rack in an erected use configuration, and unlocking the rear rack from the erected use configuration.

7. The convertible tandem stroller frame of claim 3, further includes a first lock element operatively mounted on the first outer tubes for releasably engaging with the first inner tubes to position the first inner tubes relative to the first outer tubes.

8. A convertible tandem stroller frame is featured in being capable of locking in a tandem stroller mode for installing a second seat and concurrently transporting two occupants and capable of converting said mode into a single seat mode for transporting one occupant by manipulating a release actuator installed at a front portion thereof; said convertible tandem stroller frame including:

a front rack, having at least a front strut equipped with a front wheel of the convertible tandem stroller frame;

a rear rack, having a pair of rear side struts each being equipped with a rear wheels of the convertible tandem stroller frame, and a pair of push bars connected to the rear side struts for pushing the convertible tandem stroller frame from rear side;

at least a longitudinal telescopic mechanism being extendable and retractable for lockably and adjustably connecting the front rack and the rear rack, and;

at least a locking mechanism associated with the release actuator, and adopted to lock and un-lock the longitudinal telescopic mechanism by manipulating the release actuator at the front portion of the convertible tandem stroller frame;

wherein the longitudinal telescopic mechanism includes:

a pair of first inner tubes, connected to the front rack;

a pair of second inner tubes, spaced apart from the first inner tubes and connected to the front rack;

a pair of first outer tubes, connected to the rear rack and telescopically engaged with the first inner tubes; and a pair of second outer tubes, spaced apart from the first outer tubes and telescopically engaged with the second inner tubes;

wherein the locking mechanism includes a pair of second spring-biased latches retractably mounted inside the second inner tubes and capable of protruding outwardly from the second inner tubes to engage the second outer tubes thereby positioning the second outer tubes relative to the second inner tubes in step-less increments and at least a predetermined position; and wherein the front rack further includes a first seat mounted on the second inner tubes for accommodating an occupant to sit thereon, and wherein the release actuator is a handle operatively mounted under the first seat, and associates the pair of second spring-biased latches by a second flexible connecting element.

9. The convertible tandem stroller frame of claim 8, further includes a second lock element operatively mounted on the second outer tubes for releasably engaging with the second inner tubes to position the second inner tubes relative to the second outer tubes.

* * * * *